March 1, 1955   M. B. LADDON ET AL   2,702,929
CLAMP
Filed July 26, 1951
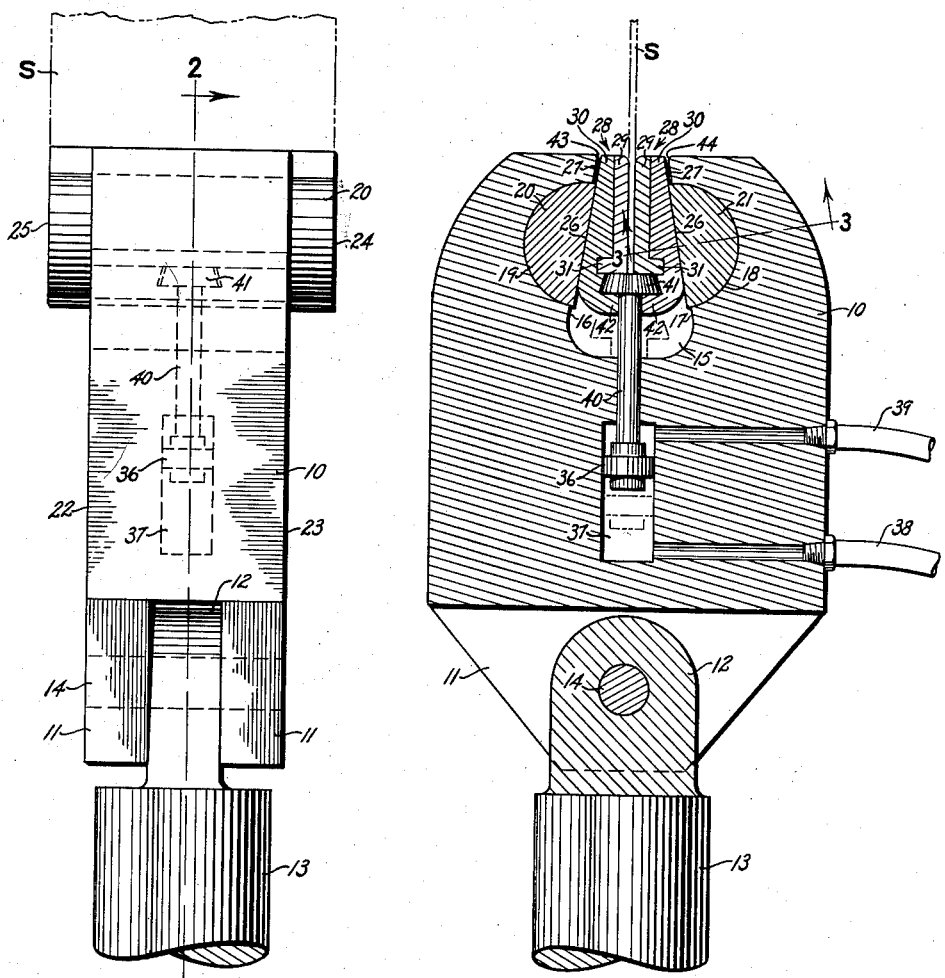
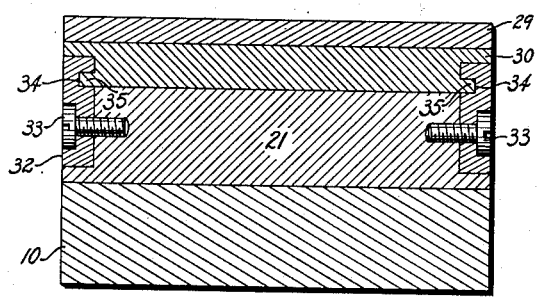
MACHLIN B. LADDON
JOSEPH C. WEIDEL
INVENTORS
BY S. Tierney Jr.
ATTORNEY

2,702,929

CLAMP

Machlin B. Laddon, San Diego, and Joseph C. Weidel, Bonita, Calif., assignors to Rohr Aircraft Corporation, Chula Vista, Calif., a corporation of California Application July 26, 1951, Serial No. 238,752

3 Claims. (Cl. 24—263)

This invention relates to a clamp adapted to grip the end of a sheet of metal or other material and exert a very large pulling force thereon.

It is an object of the invention to provide a clamp adapted to grip the end of a metal sheet and pull the sheet sufficient to stretch it without injuring the end thereof.

Another object of the invention is to provide a clamp structure with bearing surfaces subject to large stresses in which means are provided to prevent the stresses from becoming much more concentrated in some areas than in others. This concentration of pressure would cause a local failure of the metal in these areas which would interfere with the proper operation of the clamp since it would change the angle and magnitude of the clamping force.

A further object is to provide a clamping member with spaced apart jaws at one end between which the member to be clamped is received. The forces involved tend to spread the jaws further apart and interfere with proper clamping action. According to the invention, any such spreading apart of the jaws is compensated for and does not interfere with the proper operation of the clamp.

Further objects will become apparent as the description of the clamp proceeds. For better understanding of the invention, reference is made to the accompanying drawings, in which:

Figure 1 is a side view of a clamp embodying the invention,

Figure 2 is a sectional view of the clamp of Figure 1 taken on line 2—2 thereof also showing a portion of the clamp in open position and, Figure 3 is a sectional view of one side of the clamp on line 3—3 of Figure 2.

The clamp comprises a main body member 10 the lower end of which is provided with bifurcations 11 between which is received the upper end 12 of a pull bar 13 to which member 10 is pivotally connected by a pin 14. The upper end of body 10 is cut away to provide a jaw receiving opening 15 having flat, converging marginal side walls 16, 17. These walls have cylindrical shaped recesses whose peripheral walls 18, 19 provide bearing seats for a pair of substantially semicylindrical rotor members 20, 21 whose ends extend beyond the side faces 22, 23 of body 10, as indicated at 24, 25. Rotors 20, 21 have flat converging faces 26 for sliding engagement with the inclined faces 27 of a pair of similar gripping members 28. Each gripping member consists of a jaw 29 and jaw holder 30 which are interlocked for movement together by means of a foot portion 31 on jaw 29 which extends into a correspondingly shaped recess in holder 30. Holder 30 is held in sliding engagement with its rotor by a pair of retainers 32 (see Figure 3) secured to the ends of the rotors by screws 33. Each retainer is cut away to provide a groove or guide-way 34 which extends parallel to the face 26 of the rotor and into which slidingly fits a long flange 35 formed on the end of holder 30.

The jaws 29 are moved into engagement with the sheet of metal S to be stretched by a piston 36 movable in a hydraulic cylinder 37 to which fluid under pressure is supplied by flexible conduits 38, 39. Piston 36 actuates a push rod 40 having an enlarged head 41 which engages the lower ends of jaws 29 and the gripping members 28 are pulled down by a pair of feet 42 which depend from jaw holders 30 and extend under head 41.

In using the clamp to stretch the flat sheet S over a convexly curved pattern (not shown), the clamp and pull bar 13 are raised by a piston (not shown) operating in a hydraulic cylinder until the end of S lies between spaced apart jaws 30. Fluid is then admitted through conduit 38 which raises piston 36 and gripping members 28, the converging faces 26 of the rotors causing jaws 29 to move in to the positions shown in full lines in Figure 2 and firmly grip the opposite faces of sheet S. If desired, the gripping faces of the jaws may be roughened in any suitable manner to increase their holding power. A large force is now applied to rod 13 to pull it and the entire clamp including body member 10 down by an amount sufficient to stretch sheet S into conformity with the pattern, the opposite end of the sheet being similarly pulled by a similar clamp. In stretching large metal sheets it has been found that although the clamp parts including main body member 10 may be made massive and of strong steel, nevertheless the outward component of the force exerted on the upper portion of body 10 due to the taper of jaw holder faces 27 is so great as to cause flexure within body 10. This flexure causes further separation between the ends 43 and 44 of converging walls 16, 17 and, if rotors 20 and 21 were not rotatably mounted, the entire pressure would become concentrated in the horizontal lines of contact where the lower ends of jaw holders 30 bear against the rotors. This concentration of pressure would cause a local failure of the metal in these regions which would interfere with the proper operation of the clamp since it would change the angle and magnitude of the force with which the jaws 29 grip sheet S. However, due to the rotors being mounted for relative rotation with reference to main body 10, the top portions of their inclined faces 26 remain in full contact with clamp holders 30 and the outward pressure exerted by holders 30 is uniformly distributed over the entire areas of the holders and rotors which are in contact. This construction thus prevents the rapid wearing away of the lower portions of holders 30 or the rotors which would result from the concentration of the pressure along a single line contact between these members.

After the sheet S has been stretched, fluid is admitted under pressure through conduit 39 to force piston 36 down, thus causing head 41 to pull gripping members 28 down and cause the jaws 29 to free the sheet.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and desire to secure by Letters Patent is:

1. A massive clamp adapted to grip the end of a metal sheet and apply sufficient tension thereto to stretch the sheet beyond its yield point comprising, in combination: a main body member composed of a continuous mass of metal having substantially parallel end faces, said body at its upper end being provided with a clamp-receiving notch extending from one end face to the other and the walls of said notch converging upward, each of said converging walls having a semi-cylindrical recess extending the full length of the wall; metallic substantially semi-cylindrical rotors journaled in said recesses and extending from one of said end faces to the other end face; gripping members having oppositely disposed parallel jaw faces adapted to grip the opposite faces of the sheet and also having inclined faces in contact with the flat faces of said rotors throughout the entire length of said flat faces; and fluid operated means for moving said gripping members up along the rotors into engagement with the faces of the sheet.

2. A massive clamp adapted to grip the end of a metal sheet and apply sufficient tension thereto to stretch the sheet beyond its yield point comprising, in combination: a main body member composed of a continuous mass of metal having substantially parallel end faces, said body at its upper end being provided with a clamp-receiving notch extending from one end face to the other, each side of said notch being provided with a semi-cylindrical recess; metallic substantially semi-cylindrical rotors journaled in said recesses and having their flat faces converging upward; gripping members having oppositely disposed parallel jaw faces adapted to grip the opposite faces of the sheet and also having inclined faces in contact with the flat faces of said rotors; said body member being provided in the plane of the sheet with a cylindrical bore; a piston slidable in said bore; a piston rod having its lower end connected to said piston and its upper end connected to said gripping members; means for supplying fluid under pressure to the lower end of said bore and means for supplying fluid under pressure to the upper end of said bore to force the piston down and thereby lower the gripping members.

3. A massive clamp adapted to grip the end of a metal sheet and apply sufficient tension thereto to stretch the sheet beyond its yield point comprising, in combination: a main body member composed of a continuous mass of metal having substantially parallel end faces, said body at its upper end being provided with a clamp-receiving notch extending between said end faces and the walls of said notch converging upward, each of said converging walls having a semi-cylindrical recess extending the full length of the wall, long metallic substantially semi-cylindrical rotors journaled in said recesses; a pair of jaws disposed in said notch and having opposed parallel faces arranged to grip the opposite faces of the sheet; a slidable member located under said jaws and having a head in contact therewith; a pair of jaw holders surrounding said jaws and having their lower ends in contact with and locked to said head and having converging flat faces in sliding contact with the flat faces of said rotors; and fluid operated means for raising and lowering said slidable member.

References Cited in the file of this patent

UNITED STATES PATENTS

| Number | Name | Date |
|---|---|---|
| 213,586 | Olsen | Mar. 25, 1879 |
| 1,525,122 | Ericsson | Feb. 3, 1925 |
| 1,541,669 | Summers | June 9, 1925 |
| 1,836,524 | Brittain | Dec. 15, 1931 |
| 2,218,503 | Brooks | Oct. 22, 1940 |
| 2,279,964 | Berliner | Apr. 14, 1942 |
| 2,349,520 | Ripley | May 23, 1944 |
| 2,522,319 | Tinley | Sept. 12, 1950 |